J. JESSEN.
BUTTONHOLE MACHINE.
APPLICATION FILED FEB. 3, 1909.

993,070.

Patented May 23, 1911.
5 SHEETS—SHEET 1.

WITNESSES:
W. P. Baranowski
H. Christopher

INVENTOR:
JAMES JESSEN
BY Paul O'Paul
ATTORNEYS

J. JESSEN.
BUTTONHOLE MACHINE.
APPLICATION FILED FEB. 3, 1909.

993,070.

Patented May 23, 1911.
5 SHEETS—SHEET 2.

WITNESSES:
W. P. Baranowski
H. Christopher

INVENTOR
JAMES JESSEN.
BY Paul & Paul
ATTORNEYS

J. JESSEN.
BUTTONHOLE MACHINE.
APPLICATION FILED FEB. 3, 1909.

993,070.

Patented May 23, 1911.

WITNESSES:
W. P. Baranowski
H. Christopher

INVENTOR:
JAMES JESSEN.
BY Paul & Paul
ATTORNEYS

UNITED STATES PATENT OFFICE.

JAMES JESSEN, OF MINNEAPOLIS, MINNESOTA, ASSIGNOR, BY MESNE ASSIGNMENTS, TO D. & D. BUTTON-HOLE MACHINE COMPANY, OF MINNEAPOLIS, MINNESOTA, A CORPORATION OF MINNESOTA.

BUTTONHOLE-MACHINE.

993,070.      Specification of Letters Patent.     Patented May 23, 1911.

Application filed February 3, 1909. Serial No. 475,799.

*To all whom it may concern:*

Be it known that I, JAMES JESSEN, of Minneapolis, Hennepin county, Minnesota, have invented certain new and useful Improvements in Buttonhole-Machines, of which the following is a specification.

The object of my invention is to provide a button hole machine, which will employ only a comparatively small number of parts, be compact and durable in construction and also comparatively inexpensive to manufacture.

A further object is to provide a button hole machine of such a simple design and mechanism that it will require but little attention and cannot easily get out of order or adjustment.

My invention consists generally in improved means for regulating the bight or length of the stitches.

Further, the invention consists in improved feeding means.

Further, the invention consists in improved means for shifting the work from one side of the button hole to the other.

Further, the invention consists in providing means which will permit the operation of the mechanism at a high speed without causing imperfections in the work, and, further the invention consists in various constructions and combinations all as hereinafter described and particularly pointed out in the claims.

In the accompanying drawings, forming part of this specification.

In the drawings, 2 represents a base or frame, in which the operating mechanism of the button hole machine is mounted.

3 and 4 are upper and lower clamp plates and 5 is a gripper plate carried by the upper clamp plate and having a screw device 6 for regulating its tension on the goods.

7 is a rock shaft having bearings in a bracket 8 and an upright standard 9 and provided with an arm 10 having a forked end, which has a sliding connection with a needle bar and is reciprocated by the vertical movement of said bar. A rocker 11 is secured on the shaft 7 and provided with arms 12 and 13, which are yieldingly held against the surface of a vertically arranged plate 14 by the tension of a spring 15 coiled on the shaft 7 between the bracket 8 and the rocker 11. In the rear of the plate 14 is a plate 16 that is vertically slidable in guides 17 provided in the standards 9 and the plate 14 has an inwardly-turned lip 18, which laps over the upper edge of the plate 16 and is also provided on its lower edge with lugs 19, which project inwardly under the lower edge of said plate 16. The plate 14 is narrower than the space between the guide ways 17 and has a horizontal movement independent of the plate 16 and a vertical movement simultaneously therewith. The outer face of the plate 16 is provided with a series of lugs 20, 21, 22 and 23, which project horizontally into the path of the rocker arms 12 and 13 and are engaged laterally by the said arms when said rocker is oscillated. The effect of this engagement is plainly shown in Figs. 7 to 10 inclusive.

Figure 7:
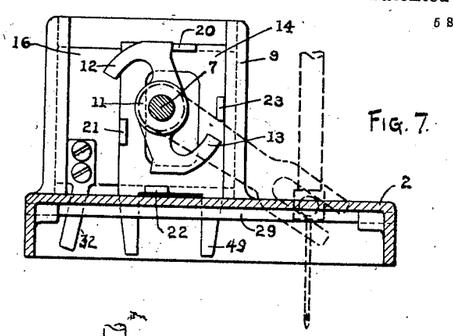
Fig. 7 is a transverse, sectional view, illustrating the needle bar in its down position.
Figure 8:
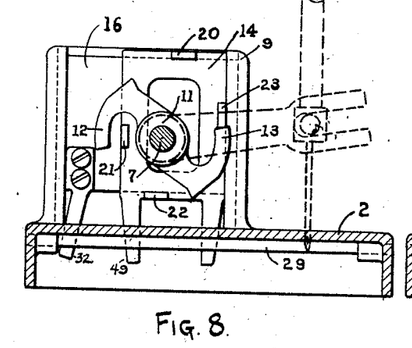
Figs. 8, 9, and 10 are similar views, illustrating different positions of the mechanism in the stitch forming operation.
Figure 9:
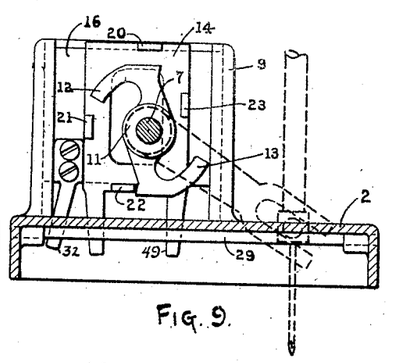
Figure 10:
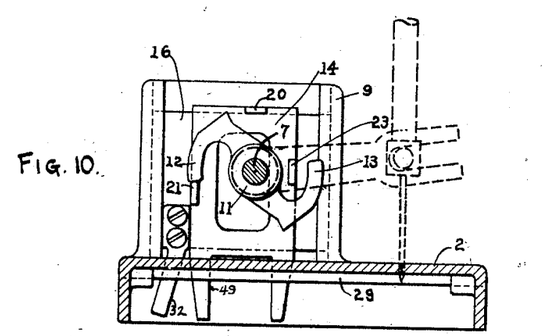
Figure 15:
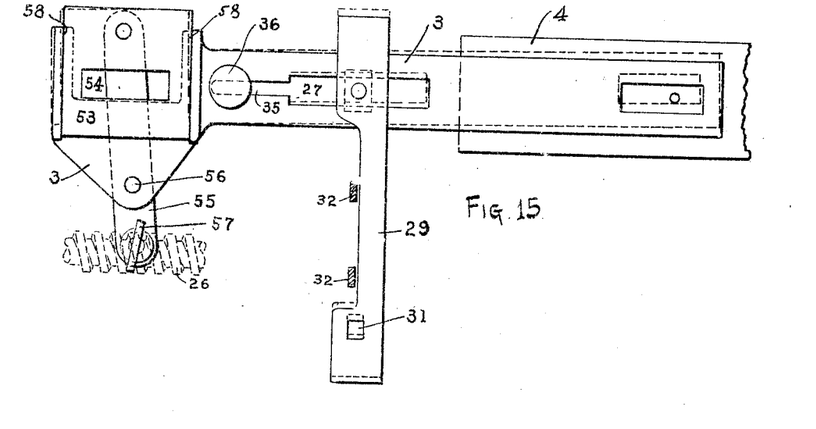
Fig. 15 is a bottom view of the shifting mechanism.
Figure 16:
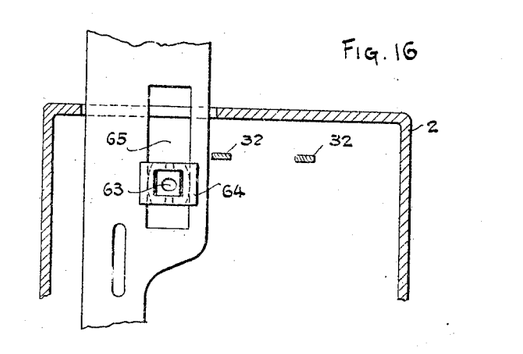
Fig. 16 is a detail sectional view, showing the connection between the clamp plate and the shifter bar.

Referring to Fig. 7, it will be noted that the oscillation of the arm 13 toward the right will cause it to engage the lug 23, whereupon the plates 14 and 16 will be moved vertically in the guide ways 17 until the limit of the upward movement is reached, (see Fig. 8.) The return stroke of the arm 13 will cause it to engage the lug 22 and the plate 14 will then be moved horizontally on the plate 16 without imparting a vertical movement thereto, as shown in Fig. 9. The next movement of the rocker will bring the arm 12 into engagement with the lug 21 and both plates will be forced down (see Fig. 10). The plate 14 thus passes entirely around the sides of a square and during its horizontal movement, the plate 16 will remain stationary, but during the vertical movement of the plate 14, a corresponding movement will be imparted to the plate 16. The lugs 19 projecting inwardly from the lower edge of the plate 14, are adapted to pass between the teeth 24 of a feed wheel 25 that is secured on one end of a feed screw 26. The lugs are so arranged that there will always be one of them between the teeth of the wheel and consequently premature or excessive movement of the wheel will be prevented. These lugs, will of course, follow the stroke of the plate 14 and during the horizontal movement of said plate, will pass from one side of the feed wheel to the other, moving one of the lugs from its position between the teeth on one side to an inoperative position, and setting the other lug in an operative position between the teeth. The purpose of this will be obvious, for in order to maintain the continuous movement of the feed screw in one direction by means of vertical reciprocation of the plate 14, it will evidently be necessary to shift the lugs from one side of the feed wheel to the other. For instance, assuming that one of the lugs is between the teeth of the wheel on one side, an upward movement is imparted to the plate 14 to revolve the wheel. Then, to continue this revolving movement in the same direction, it will be necessary to move the plate horizontally, so that the other lug will pass between the teeth on the other side of the wheel and be moved downward with the plate to continue the revolution of the feed wheel and screw.

For the purpose of imparting an oscillating movement to the clamp plates and forming the bight of the stitches, I provide a longitudinal slot 27 in the upper clamp plate 3 and provide a block 28 that is slidable in said slot and is attached to a plate 29 by means of a screw 30. Upon loosening this screw, the position of the block in the slot may be changed and the oscillation of the clamp plate regulated. The plate 29 extends across the machine and has a hole 31 therein that is adapted to receive a depending, inclined arm 32, the edge of which contacts with the wall of the opening in the plate and causes the reciprocation of the plate 29, when the plate 16, to which the arm 32 is secured, is moved vertically by the operation of the plate 14.

Figure 6:
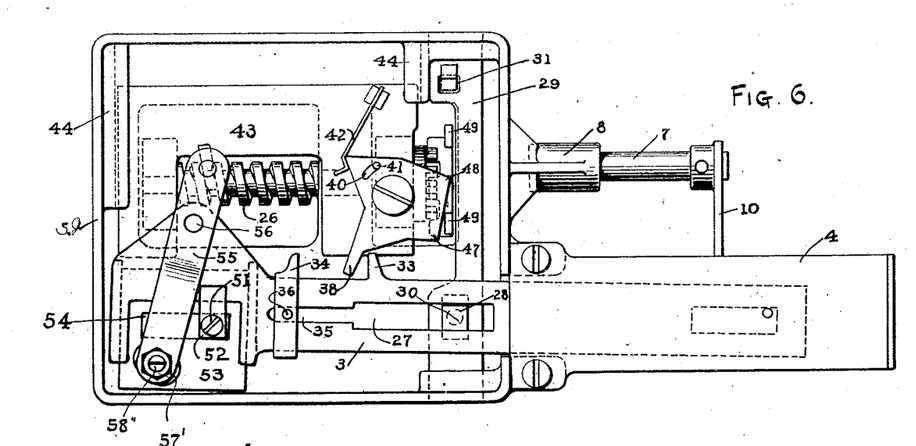
Fig. 6 is a view similar to Fig. 4, illustrating another position of the mechanism.

Upon the upper clamp plate is a lug 33 projecting horizontally from one edge thereof, toward the feed screw, and a stop device 34 is adjustable in the slot 35 in said plate, by means of a screw 36. The lug 33 and the stop 34 oppose one another and the distance between them may be increased or decreased by the adjustment of the stop. A plate 37 has an arm 38 which projects into the space between the lug 33 and the stop 34, to be engaged and actuated thereby during the movement of the clamp plate. The plate 37 is pivoted at 39 and is adapted to swing horizontally on its pivot. It is limited in this oscillation by a slot 40 and a pin 41 and has a spring 42, which normally holds the plate in position where its pin will be in one end of the slot 40, the engagement of the lug 33 and the stop 34 with the arm 38 causing the plate to swing sufficiently to carry the pin 41 past the center of the plate and whereupon the spring 42 will hold the plate in either position in which it may be adjusted. The plate 37 is mounted on a slide 43 movable in guides 44 and on which slide the feed screw is supported. The pin 41 is mounted in the slide 43 and projects into the slot 40, as indicated in Fig. 6. The plate 37 thus has an oscillating movement independently of the plate 43 and a movement toward and from the feed plate with the plate 43. The screw 45 in a slot 46 also serves as a guide for the slide, and the plate 37 has projections 47 and 48, in position to be engaged by fingers 49, which depend from the plate 14 and when the plate 37 is oscillated by the engagement of the lug 33 or the stop 34, it will be swung into the path of the fingers 49 and during the horizontal movement of the plate 14, the adjustment of one of the projections 47 or 48 in the path of a finger, will cause the horizontal movement of the slide 43 and shift the feed wheel from engagement with a lug on one side of the wheel into engagement with the corresponding lug on the other side, and this movement will have the effect of reversing the direction of revolution of the feed screw when the rocking movement of the shaft 7 is resumed. I am thus able to form the stitches on one side of the button hole cross to the opposite side and return on that side to the starting point, without stopping the mechanism. The adjustment of the stop 34 and its distance from the lug 33 will be determined by the length of the button hole, the stop being so arranged that the shifting operation will take place at the moment when the stitching on one side of the button hole is completed and the shifting to the opposite side of the button hole is desired.

Figures 5, 11, 12, 13, 14:
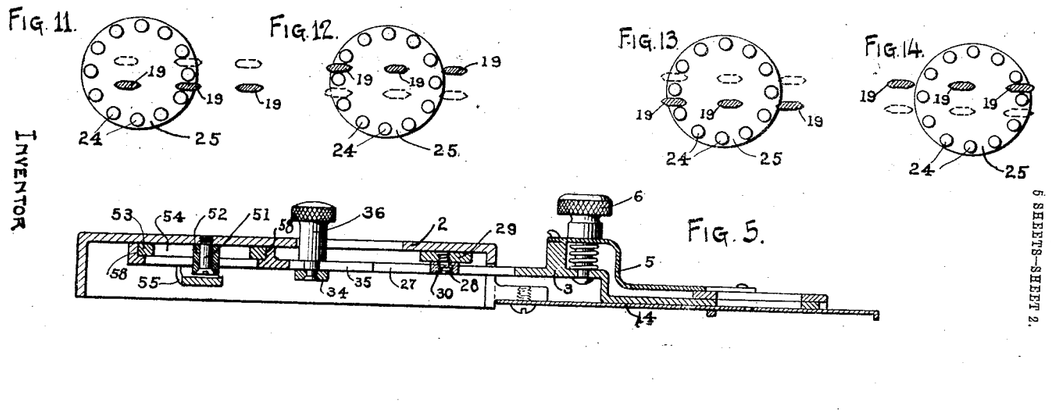
Fig. 5 is a sectional view on the line Y—Y of Fig. 4.
Figs. 11, 12, 13 and 14 are detail views, illustrating the toothed wheel carried by the feed screw and the means for operating the same.
Figure 18:
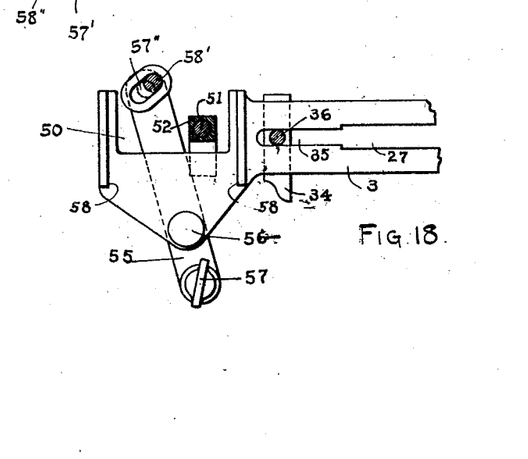
Fig. 18 is a detail view of a portion of the shifter mechanism.

The feed plate has a recess 50 therein and a screw 51 provided with a square, flanged block 52, is threaded into the base 2 (see Figs. 5 and 18). A plate 53 has a longitudinal slot 54, through which the screw 51 passes and on this screw and the block 52 the feed plate and the plate 53 slide (see Figs. 5 and 6). The edges of the plate 53 form guides for the feed plate and the shifting of said plates in changing from one side of the button hole to the other is effected by means of a bar 55 that is mounted at a point intermediate to its ends on a pin 56, carried by the feed plate and said bar has a shoe 57 at one end, which engages the feed screw (see Fig. 6). A block 57' is interposed between the bar 55 and the plate 53 and has a slot 57'' therein and in which, a pin 58' carried by the plate 53 is loosely inserted, the block having a sliding movement on said pin. The block 57' has a stud 58'' thereon, secured by a lock nut to the bar 55 and upon loosening this nut, adjustment of the block 57' is permitted for the purpose of changing the angle of its slot with respect to the bar and regulating the lateral movement of the feed plate according to the width of the button hole (see Figs. 5, 6, and 18). The block 57' slides on the pin 58' and allows the bar 55 to adjust itself to the forward and reverse movement of the feed screw. Guides 58 are provided on the feed plate on each side of the plate 53.

It is sometimes desirable to disengage the shoe of the lever 55 from the screw, as for instance,—when a thread is accidentally broken and the operator wishes to begin the stitching over again. In that case, the pin 56, which has a vertical movement in the feed plate, may be forced down against the tension of the spring 59 and when that is done, the shoe 57 will be forced out of engagement with the screw, and the lever and feed plate can be moved back to the starting point again or set at any other point on the feed screw.

Figure 17:
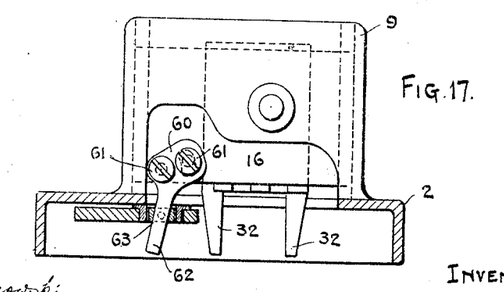
Fig. 17 illustrates a modified construction of the means for operating the shifter bar.

In Fig. 17, I have illustrated a modified construction, which consists in providing a plate 60 adjustable on the plate 16, by means of screws 61 fitting within enlarged openings in said plate and said plate having an arm 62 that fits within an opening in a block 63 that is pivoted in a plate 64 that is slidable in a slot 65 in the plate 29. By means of this adjustment, the stroke of the plate 29 can be regulated and the length of the stitches controlled.

Figure 1:
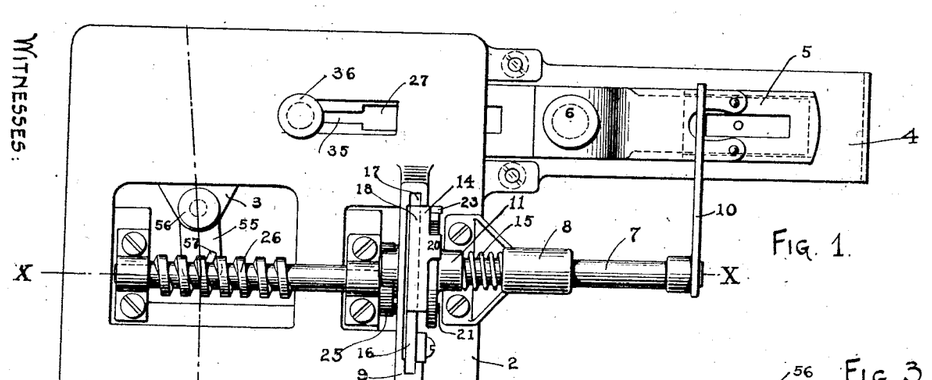
Figure 1 is a plan view of a button hole machine, embodying my invention.
Figures 2, 3:
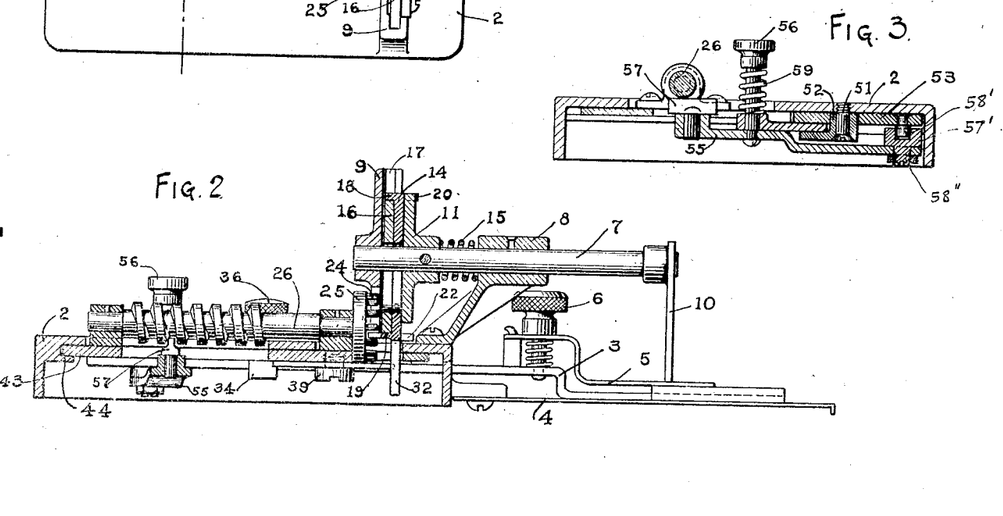
Fig. 2 is a longitudinal, sectional view on the line X—X of Fig. 1.
Fig. 3 is a transverse, sectional view on section line Z—Z of Fig. 4.
Figure 4:
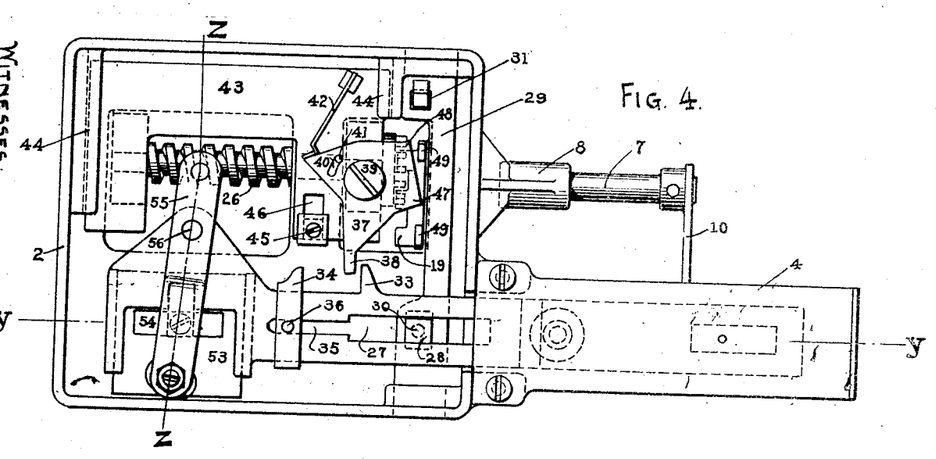
Fig. 4 is a bottom view of the machine.

In the operation of my device, the cloth is clamped between the upper and lower clamp plates 3 and 4. As the needle vibrates, the rock shaft 7 is oscillated and the plate 16 moved up and down. The arm 32 carried by the plate 16 will reciprocate longitudinally the plate 29, which in turn will vibrate laterally the clamp plates and position the same so that the needle will enter first into the material and then into the button hole slit or over the edge of the material, to form the buttonhole stitch. The plate 14 is moved in a rectangular path and in turn will give to the feed screw 26 an intermittent rotation. Said feed screw, through the bar 55 and its connection to the feed slide, will gradually carry the clamp plates in a longitudinal direction, thus spacing the stitches along the edge of the buttonhole. When the end of the buttonhole is reached, the shift plate 37 will be moved by either the lug 33 or 34, so as to position one of its shoulders in the path of the arms 49, carried by the plate 14. As the plate 14 is then moved laterally through the action of the rock shaft 7, the slide 43 supporting the feed shaft and the shift plate will be moved bodily laterally, so as to position the feed shaft relatively to the movements of the plate 14, whereby said feed shaft will be rotated in the opposite direction. The shift plate merely accomplishes the reversal of rotation of the feed screw. When the feed screw is reversed in movement, the bar 55 will be swung about its pivotal connection 56, as viewed in Fig. 4, carrying the block 57' with it, and this movement of the block 57' through the cam slot 57'' will cause a lateral movement in the end of the feed slide, swinging the same about the fulcrum lug 28, and thus positioning the clamp plates, so that in the reverse movement of the feed plate, the other side of the buttonhole will be stitched. The same action occurs at the opposite end of the buttonhole and the parts are positioned for the stitching of another buttonhole.

While I have shown and described the essential features of my buttonhole stitching mechanism as embodied in an attachment complete in itself, which may be connected to any organized sewing machine for operation, it is obvious that said essential features of the mechanism, as pointed out in the appended claims, may be embodied in the organized mechanism of the sewing machine, thus producing a machine which is more especially adapted for factory work, wherein the machines are driven by power at high speed. It is to be understood that such an embodiment of the combination of elements set forth in the appended claims, may be made without departing from the spirit of my invention.

I claim as my invention:

1. In a button hole machine, the combination, with a feed plate and a clamp plate, of a rock shaft, and means for operating the said rock shaft, a rocker mounted on said shaft, a plate arranged in the path of said rocker and adapted to be actuated thereby, said plate having a movement in one direction during a portion of the stroke of said rocker and a subsequent movement at right angles to such preceding movement, and means actuated by said plate and operatively connected with said feed plate.

2. In a button hole machine, the combination, with a feed plate and a clamp plate, of a rock shaft, a rocker mounted thereon, a sliding plate having a continuous movement following the outline of a rectangle and actuated by said rocker, a guide for said sliding plate and means operated by said sliding plate and operatively connected with said feed plate.

3. In a button hole machine, the combination, with a feed plate and a clamp plate, of a rock shaft, a rocker secured on said shaft and having arms projecting therefrom, a sliding plate having means in the path of said arms and moving in the outline of a rectangle, a guide for said sliding plate and a feed screw operated by said sliding plate and connected with said feed plate.

4. In a button hole machine, the combination, with a feed plate and a clamp plate, of a rock shaft, a rocker secured on said shaft, a sliding plate having two movements at right angles to one another and located in the path of said rocker and actuated thereby, a feed wheel having a series of teeth, lugs projecting from said sliding plate and adapted to engage the teeth of said feed wheel and means operatively connecting said feed wheel with said feed plate.

5. In a button hole machine, the combination, with a feed plate and a clamp plate, of a rock shaft, a rocker secured on said shaft, a sliding plate in the path of said rocker and actuated thereby in directions at right angles to one another, a feed screw actuated by said sliding plate, and means operatively connecting said feed screw with said feed plate.

6. In a button hole machine, the combination, with a feed plate and a clamp plate and needle bar, of a rock shaft, a rocker secured on said shaft, a plate in the path of said rocker to be engaged and actuated thereby, said plate having movements alternately at right angles to one another, a feed screw operatively connected with said feed plate, and a feed wheel mounted on said feed screw and arranged to be actuated by said sliding plate during one of its movements.

7. In a button hole machine, the combination, with a feed plate and a clamp plate, of a rock shaft, a rocker, a sliding plate in the path of said rocker, said plate having two movements at right angles to one another, a feed screw operatively connected with said feed plate, and means actuated during one movement only of said sliding plate for operating said feed screw.

8. In a button hole machine, the combination, with a feed plate and a clamp plate, of a rock shaft, a rocker carried by said shaft, a sliding plate in the path of said rocker and actuated thereby in two directions at right angles to one another, lugs on said plate, a feed wheel having teeth between which said lugs project, means operatively connecting said feed wheel with said feed plate, and the lugs projecting between the teeth of said feed wheel having an inoperative movement with their supporting plate and moved thereby between the teeth of said wheel or away from the same, and the other movement of said sliding plate and said lugs operating to revolve said feed wheel, substantially as described.

9. In a button hole machine the combination, with a feed plate, a clamp plate and a needle bar, of a rock shaft operatively connected with said bar, a rocker carried by said rock shaft, a vertically movable sliding plate in the path of said rocker, an arm carried thereby having an inclined surface, and a bar having a slot to receive said arm and operatively connected with said feed plate.

10. In a button hole machine, the combination, with a feed plate, a clamp plate of a rock shaft, a rocker secured on said shaft, a plate actuated by the movement of said rocker, an arm depending from said plate and having an inclined surface, a bar having a slot to receive said arm and operatively connected with said feed plate, the movement of said sliding plate having the effect of moving said bar lengthwise to oscillate said feed plate, substantially as described.

11. In a button hole machine, the combination, with a feed plate and a clamp plate, of a rock shaft, a rocker secured on said shaft, a vertically sliding plate, means interposed between said sliding plate and said rocker and having lugs in the path of said rocker to be engaged and actuated thereby, said sliding plate having a depending arm provided with an inclined surface, a bar having a slot to receive said depending arm and operatively connected with said feed plate, substantially as described.

12. In a button hole machine, the combination, with a feed plate and a clamp plate, of a rock shaft, a plate slidable in guides, a second plate carried by said first named plate and adapted to move vertically therewith and horizontally independently thereof, said second named plate having lugs projecting therefrom, means mounted on said rock shaft and adapted to engage said lugs and impart an alternate vertical and horizontal movement to said second named sliding plate, and means actuated by said vertically and horizontally sliding plate and operatively connected with said feed plate, substantially as described.

13. In a button hole machine, the combination, with a needle bar, a feed plate and a clamp plate, of a feed screw, means operatively connecting said screw with said feed plate, a feed wheel mounted on said screw and having a series of teeth, and means including a plate having a rectangular path and adapted to engage said teeth and revolve said screw and operatively connected with said needle bar, substantially as described.

14. In a button hole machine, the combination, with a feed plate and a clamp plate, of a feed screw, means operatively connecting said feed screw with said plate, a journal plate upon which said feed screw is mounted, said means having an adjustable connection with said feed plate and means actuated at predetermined intervals for shifting said journal plate laterally, for the purpose specified.

15. In a button hole machine, the combination, with a feed plate and a clamp plate, of a feed screw, a feed wheel mounted thereon, means operatively connecting said feed screw with said feed plate, a sliding plate having lugs adapted to interlock with the teeth of said feed wheel, means for moving said plate in a rectangular path to revolve said screw, and means for shifting said feed screw and wheel to effect a reversal in the movement of the same.

16. In a button hole machine, the combination, with a feed plate and a clamp plate, of a feed screw, means operatively connecting said feed screw with said feed plate, a sliding plate having two movements at right angles to each other and provided with means to interlock with the teeth of said feed screw and be moved out of engagement therewith, means for operating said sliding plate, and means for shifting said feed screw and wheel to obtain a forward movement of the screw and a reversal thereof.

17. In a button hole machine, the combination with a feed plate, a clamp plate, of a feed screw, a bar having a shoe to engage the threads of said screw, means for operating said screw, said bar having a connection with said feed plate for moving the same longitudinally, said connection including a block having a diagonal slot, and a pin movable in said diagonal slot whereby said bar may move relative to said feed plate and through said diagonal slot and pin connection, shift the feed plate laterally.

18. In a button hole machine the combination, with a feed plate and a clamp plate, of a feed screw and bar attached to said feed plate at a point intermediate to said bar, and said bar having a shoe at one end arranged to engage the threads of said screw, a plate having a diagonal slot in which said bar is adjustable and means for separating said shoe from said feed screw at any point in the travel of the screw thereon.

19. In a button hole machine, the combination with a feed plate, a clamp plate, of a feed screw, a bar having a shoe to engage the threads of said screw, means for operating said screw, said bar having a connection with said feed plate for moving the same longitudinally, said connection including a block having a diagonal slot, and a pin movable in said diagonal slot whereby said bar may move relative to said feed plate and through said diagonal slot and pin connection, shift the feed plate laterally, and means whereby said block may be adjusted to vary the lateral shift of the feed plate.

20. In a button hole machine, the combination with a feed plate and a clamp plate, of a feed screw, a plate laterally slidable upon said feed plate, a bar, a shoe carried by said bar and adapted to engage said feed screw, and devices for pivotally connecting said bar to said laterally sliding plate, said devices including an adjustable block having a diagonal slot, and a pin adapted to engage said slot.

21. In a button hole machine, the combination, with a feed plate and a clamp plate, of a feed screw operatively connected with said feed plate, a shifter plate, means carried by said feed plate for positively moving said shifter plate, means for revolving said feed screw, and means actuated by said revolving means for operating said shifter plate to move said feed screw and feed plate, substantially as described.

22. In a button hole machine, the combination, with a feed plate and a clamp plate, of a shifter plate and means actuated thereby to shift said feed and clamp plates, means carried by said feed plate for moving said shifter plate, a sliding plate, and means for operating the same, said sliding plate having means to engage and move said shifter plate when it has been set by the operation of said feed plate.

23. The combination, with a feed plate and a clamp plate, of a feeding means therefor, a shifter plate actuated at a predetermined period by said feed plate and means actuated by said shifter plate to shift said feed and clamp plates, a sliding plate having arms arranged to engage said shifter plate when it has been set by the movement of said feed plate, and means for actuating said sliding plate, substantially as described.

24. The combination, with a frame, of a transversely sliding plate, a feed plate arranged to slide with said first named plate and having a transverse movement with respect thereto, a clamp plate, a feed screw, a bar pivoted on said feed plate and having a shoe to engage said screw, means pivotally connecting the opposite end of said bar with said first named plate.

25. The combination, with a frame, of a transversely sliding slotted plate, a feed plate having a lengthwise movement with said first named plate and movable laterally independently thereof, a feed screw and means for revolving the same, a clamp plate, a bar having a shoe at one end to bear on said feed screw and pivoted at a point intermediate to its ends on said feed plate, said bar having an adjustable connection with said first named plate whereby the shifting of said feed plate can be regulated according to the width of the button hole.

26. The combination, with a feed plate and a clamp plate, of a feeding means therefor, a shifter plate arranged to be actuated at a predetermined period by said feed plate, means actuated by the movement of said shifter plate to shift said feed and clamp plates, a vertically and horizontally sliding plate having depending arms arranged to engage said shifter plate, and means for actuating said sliding plate to shift said feed means and said feed plate.

27. In a button hole machine, the combination, with a feed plate and a clamp plate, of a feed screw operatively connected therewith, a shifter plate, and means actuated thereby to shift said feed and clamp plates, means carried by said feed plate to engage and operate said shifter plate, means for operating said screw, and means actuated by said operating means for engaging said shifter plate at predetermined intervals and shifting said screw and feed plate.

28. In a button hole machine, the combination, with a clamp plate, a feed plate and a rocker arm, and means for operating said rocker arm, of a sliding member adapted to be actuated by said rocker arm in a circumscribed rectangular path once for every four strokes of said rocker arm, a reciprocating member coöperating with said sliding member, and means actuated by said sliding member and said reciprocating member for operating the said clamp plate and said feed plate in a step by step movement around the button hole.

29. In a button hole machine, the combination, with a clamp plate, a feed plate and a rocker arm and means for operating said rocker arm, of a sliding member adapted to be actuated by said rocker arm in a rectangular path once for every four strokes of said rocker arm, a reciprocating member coöperating with said sliding member, guides and stops to positively control and limit the movement of the said sliding member and said reciprocating member, and means actuated by said sliding member and said reciprocating member for operating said clamp plate and said feed plate in a step by step movement around the button hole.

30. The combination with a feed plate and a clamp plate, of a sliding plate connected with said feed plate, a feed screw, means for operating the same, an actuating member engaging said feed screw, a block carried by said actuating member, and having a diagonal slot therein, a pin carried by said sliding plate and engaging said slot, and means for reversing the movement of the feed screw.

31. The combination, with a clamp plate and feed plate and a rocker arm and means for operating the said rocker arm, of a sliding member adapted to be actuated by the said rocker arm to describe one side of a rectangle for every stroke of the said rocker arm, a reciprocating member coöperating with the said sliding member, a cam surface forming a part of said reciprocating member and inclined to the direction of its travel, a slotted sliding plate coöperating with the said cam surface and suitable connections between said slotted plate and said feed plate, for the purpose specified.

32. The combination, with a feed plate and a clamp plate, of a feed screw operatively connected with said feed plate, a feed wheel mounted on said feed screw and having pins projecting therefrom, a plate having lugs thereon adapted to pass between the pins on said wheel, the lugs on one side of said plate being out of engagement with said pins while those on the other side are in engagement therewith, means for operating said plate and means for shifting from side to side said feed screw relative to said plate to change the direction of movement of said screw.

33. The combination, with a feed plate and a clamp plate, of a feed screw operatively connected with said feed plate, a feed wheel for actuating said feed screw, a plate arranged to slide transversely with respect to said screw and having means for operating said feed wheel and means for shifting said feed screw from side to side to change the point of engagement thereof with the operating means on said plate, whereby the movement of the feed screw is reversed.

34. In a button hole machine, the combination, with a clamp plate, a feed plate and a rocker arm and means for operating said rocker arm, of a sliding member adapted to be actuated by said rocker arm in a circumscribed rectangular path once for every four strokes of said rocker arm, and means actuated from said sliding member for operating said clamp plate and said feed plate in a step by step movement around the button hole.

35. In a button hole machine, the combination, with a clamp plate and a feed plate, of a sliding member and means for actuating it in a circumscribed rectangular path, a reciprocating member operated by said sliding member, and means for converting the movements of said sliding member and said reciprocating member into movements for operating said clamp plate and said feed plate in a step-by-step movement around the buttonhole.

36. In a button hole machine, the combination, with a clamp plate and a feed plate, of a sliding member, means for actuating said sliding member in a circumscribed rectangular path once for every four strokes of its actuating means, and means for converting the movements of said sliding member and said reciprocating member into movements for operating said clamp plate and said feed plate in a step-by-step movement around the buttonhole.

37. In a buttonhole machine, the combination with a feed plate and a clamp plate, a sliding plate, means for moving said sliding plate in a rectangular path, a feed screw, and means operated by said sliding plate for intermittently rotating said feed screw, and means for actuating said feed plate from said feed screw.

38. In a buttonhole machine, the combination with a feed plate and a clamp plate, a sliding plate, means for moving said sliding plate in a rectangular path, a feed screw, means operated by said sliding plate for intermittently rotating said feed screw, means for actuating said feed plate from said feed screw, and means for reversing the direction of movement of said feed screw operated by said sliding plate and controlled by the movement of said feed slide.

39. In a buttonhole machine, the combination with a feed plate and a clamp plate, of a feed screw, means operatively connecting said screw with said feed plate, a feed wheel mounted on said screw and having a series of teeth, means including a plate movable in a rectangular path and adapted to engage said teeth and revolve said screw, and means for moving said plate in said rectangular path.

40. The combination with a feed plate and a clamp plate, of a feed screw operatively connected with said feed plate, an operating plate for said feed screw, means for moving said plate in a rectangular path, means carried by said plate for engaging and intermittently rotating said feed screw, and means for shifting said feed screw laterally relative to said plate for changing the direction of movement of said screw.

41. In a buttonhole machine, the combination with a clamp plate and a feed plate, of a sliding member and means for actuating said sliding member in a circumscribed rectangular path, said sliding member completing its cycle during every two reciprocations of the needle, and means for operating said feed plate from said sliding member, whereby said feed plate is vibrated laterally and moved longitudinally for the stitching of a buttonhole.

In witness whereof, I have hereunto set my hand this 30th day of January 1909.

JAMES JESSEN.

Witnesses:
J. A. BYINGTON,
C. G. HANSON.